(12) United States Patent
Schiller et al.

(10) Patent No.: US 11,303,469 B2
(45) Date of Patent: Apr. 12, 2022

(54) CONTACTLESS SENSOR FOR VEHICLE DIGITAL COMMUNICATIONS NETWORK

(71) Applicant: WEBFLEET SOLUTIONS B.V., Amsterdam (NL)

(72) Inventors: Henrik Schiller, Amsterdam (NL); Thomas Hagenau, Amsterdam (NL); Andre Pomsel, Amsterdam (NL); Karsten Fischer, Amsterdam (NL); Steffen Kurzke, Amsterdam (NL)

(73) Assignee: Bridgestone Mobility Solutions B.V., Amsterdam (NL)

( * ) Notice: Subject to any disclaimer, the term of this patent is extended or adjusted under 35 U.S.C. 154(b) by 0 days.

(21) Appl. No.: 17/054,227

(22) PCT Filed: May 3, 2019

(86) PCT No.: PCT/EP2019/061363
§ 371 (c)(1),
(2) Date: Nov. 10, 2020

(87) PCT Pub. No.: WO2019/215029
PCT Pub. Date: Nov. 14, 2019

(65) Prior Publication Data
US 2021/0250198 A1    Aug. 12, 2021

(30) Foreign Application Priority Data

May 10, 2018  (GB) ...................................... 1807644
May 22, 2018  (GB) ...................................... 1808353

(51) Int. Cl.
*H04L 12/40*    (2006.01)

(52) U.S. Cl.
CPC .... *H04L 12/40* (2013.01); *H04L 2012/40215* (2013.01); *H04L 2012/40273* (2013.01)

(58) Field of Classification Search
CPC ........... H04L 12/40; H04L 2012/40215; H04L 2012/40273
See application file for complete search history.

(56) References Cited

U.S. PATENT DOCUMENTS 6,571,136 B1     5/2003  Staiger
2007/0297105 A1* 12/2007 Brennan ............. H01L 27/0251
                                                        361/56
(Continued)

FOREIGN PATENT DOCUMENTS

DE    10026918 A1   12/2000
EP     1668840 A1    6/2006
(Continued)

OTHER PUBLICATIONS

International Searching Authority: International Search Report for corresponding PCT/EP2019/061363 dated Aug. 12, 2019, 6 pages.
(Continued)

*Primary Examiner* — Henry Tsai
*Assistant Examiner* — John B Roche
(74) *Attorney, Agent, or Firm* — Patterson Intellectual Property Law, P.C.

(57) ABSTRACT

A sensor 1 is arranged to read data transmitted on a digital vehicle network. The sensor comprises a wire holding unit 3, and a sensing unit 5. The wire holding unit and sensing unit are connectable to one another, the sensor further comprising a locking mechanism to lock the wire holding unit and the sensing unit together, when the wire holding unit and sensing unit are connected to one another.

20 Claims, 7 Drawing Sheets

(56) References Cited

U.S. PATENT DOCUMENTS

| | | | |
|---|---|---|---|
| 2009/0279645 A1 | 11/2009 | Berenger et al. | |
| 2013/0279049 A1* | 10/2013 | Van Fossen | B60L 53/31 |
| | | | 361/42 |
| 2015/0200632 A1* | 7/2015 | Panja | H03F 3/45183 |
| | | | 330/253 |
| 2016/0134705 A1* | 5/2016 | Medan | G01R 27/2605 |
| | | | 324/658 |
| 2018/0137692 A1* | 5/2018 | Ohmert | G07C 5/008 |

FOREIGN PATENT DOCUMENTS

| | | |
|---|---|---|
| GB | 2516236 A | 1/2015 |
| RU | 2446604 C1 | 3/2012 |
| WO | 2015004132 A1 | 1/2015 |
| WO | 2017001087 A1 | 5/2016 |

OTHER PUBLICATIONS

"Contactless reader CANCrocodile", Operation Manual Ver.1.0, Jan. 1, 2012 (Jan. 1, 2012), pp. 1-11, XP055148935, Retrieved from the Internet: URL:www.jv-technoton.com [retrieved on Oct. 24, 2014] Chapter 2 3 unit structure, Installation).

United Kingdom Intellectual Property Office: Search report for Application No. GB1808353.5, dated Nov. 2, 2018. 27 pages.

CANcliQ, Teh contctless CAN reader, Squarell technology. Recovered from the internet Oct. 31, 2018 from https://web.archive.org/web/20160227103352/https://squarell.com/en/products/cancliq/.

Simple-CAN, Ver. 1.02, Teltonika, 2017 Recovered from the internet Oct. 31, 2018 from https://web.archive.org/web/20171027235720/http://teltonika.lt:80/products/simple-can/.

uReader, universal wire reader by inendia, product page, undated. Recovered from the internet Feb. 27, 2014 from http://www.ureader.es/en/.

\* cited by examiner

CONTACTLESS SENSOR FOR VEHICLE DIGITAL COMMUNICATIONS NETWORK

FIELD OF THE INVENTION

The present invention relates to a contactless sensor for a digital vehicle network (or vehicle bus). The invention also relates to methods of installing and operating such a sensor, and to a telematics system including one or more such sensors.

BACKGROUND OF THE INVENTION

Digital communications networks are widely employed in vehicles. The communications protocols used on these in-vehicle networks varies based on the type of vehicle. One commonly used protocol used in automobiles is CAN (Controller Area Network). In-vehicle networks using this protocol are commonly referred to as CAN buses. The digital communication network may be used to transfer data, typically in the form of messages, to control the functionality of numerous systems of the vehicle, including, but not limited to, for example, the engine, brake, door, entertainment and climate systems. For example, data may be transferred between engine control units associated with different systems or subsystems. Various types of data may be transferred over the network as necessary to allow appropriate operation of the vehicle and its systems. Examples of data which may be transferred include, but are not limited to, sensor data, diagnostic state data, operating parameters, control signals etc. Such data may be transferred from one system or subsystem to another over the network.

For various applications, it may be desirable to be able to read data, e.g. messages, carried over a digital vehicle (communications) network. Such data may be used by telematics control units (TCUs) in a wide range of applications such as, but not limited to, vehicle diagnostics, fuel management, fleet management, infotainment provision, and the implementation of insurance "black box" systems or pay as you drive systems. Applications utilising digital vehicle network data are ever increasing, with more connected car products being released on the market seeking to provide added value and functionality to, for example, the vehicle user, manufacturer or manager. The TomTom® LINK devices are examples of (fixed-install) telematic control devices which may be connected to a vehicle in a manner such that they are able to read data transmitted on the digital vehicle network. Such devices are able to track the movements of the vehicle and may perform additional functions such as, but not limited to, monitoring driver behaviour, monitoring fuel consumption or engine emissions, and performing engine diagnostics. The integration of the device with the digital vehicle network enables the device to provide numerous functions using the sensed data, of which the above possibilities are merely exemplary.

Conventionally, in order to be able to read data carried on the digital vehicle network, it was necessary for there to be physical contact between the sensor device and the wires of the network. However, it has been recognised that such contact arrangements are undesirable. There is a risk of damage to the wiring of the digital vehicle network in installation of such a sensor. Vehicle manufacturers typically do not permit physical connections to be made to the vehicle network for reliability and safety reasons, and the use of a wired sensor may invalidate the vehicle warranty. The use of physically connected sensors is also often impractical due to space constraints, and the need to make a connection at a specific point on the wiring of the network, e.g. on a CAN bus.

To overcome these problems, contactless digital vehicle network sensors have been proposed. These avoid the need to cut or solder the wires of the digital vehicle network, thus preserving its integrity. Installation is typically straightforward, and may be performed by a user with no specific tools or training. The device may be removed and refitted.

While inductive sensing has been proposed in the context of providing a contactless sensor, due to the inherent susceptibility of such sensors to noise, which is significant in the vehicle environment, most wireless sensors for use in this context have been capacitance sensors. Examples of such sensors, which may be used to detect data transmitted between nodes on a CAN bus, are described in DE 10026918 A1, US 2009/0279645 A1, RU 2446604 C1, and WO 2015/004132 A1. The sensor described in WO 2015/004132 A1, for example, includes a clamshell type housing, having two parts which are hingedly connected. The two parts of the housing are brought together so as to clamp the wires of a digital vehicle network cable therebetween, and establish a capacitive coupling between the wires and respective capacitive sensing parts of the sensor. The sensor includes a processor for reconstructing the vehicle network data based upon the sensed capacitance. The reconstructed data may then be output to a telematics control unit (TCU), or similar device.

The Applicant has realised that there remains scope to improve contactless sensors used to read data messages on vehicle digital communications networks, and in particular on in-vehicle buses used in automobile. For example clamshell type sensors, such as the device described in WO 2015/004132 A1, have a relatively large footprint when in their open state, making installation difficult in the typically constrained space of the vehicle, where a connection to the vehicle network may be required. Furthermore, the power consumption of known contactless sensors may be relatively high, which is particularly problematic as the sensors often need to be continually powered from vehicle battery (even when the engine of the vehicle is not running).

SUMMARY OF THE INVENTION

In accordance with a first aspect of the invention, there is provided a (contactless) sensor for reading messages transferred over a digital communications network of a vehicle, the sensor comprising:

a wire holding unit arranged to hold one or more wires of the network; and a sensing unit comprising:

sensing means arranged to detect messages carried by the one or more wires using capacitive and/or inductive coupling; and processing means arranged to generate digital output signals indicative of messages detected by the sensing means, wherein the wire holding unit and sensing unit are connectable to one another, the sensor further comprising:

locking means arranged, when the wire holding unit and the sensing unit are connected to one another, to lock the wire holding unit and the sensing unit together.

In accordance with the invention, therefore, the contactless sensor includes a wire holding unit and a separate sensing unit, wherein the wire holding unit and sensing unit may be connected and locked together to provide the sensor.

By providing separate wire holding and sensing units, the sensor may be installed more readily in use, even where there is limited space, as it typically the case in the region of a vehicle where the wires of the digital communications network of the vehicle, or "digital vehicle network", are located. One or more wires of the digital vehicle network may first be mounted to the wire holding unit, and the sensing unit then connected and locked to the wire holding unit. This may enable the sensor to be connected more easily to the digital vehicle network than prior art devices, such as that disclosed in WO 2015/004132 A1, in which the wires are located relative to the sensor when the sensor housing is in an open configuration, with the sensor housing then being closed around the wires to clamp the sensor to the wires. As described above, such arrangements are not space efficient, due to the relatively large footprint of the housing in the open configuration. Preferably the sensor is a two part sensor, including only the wire holding unit and the sensing unit, and no additional parts.

The wire holding unit is configured to securely hold one or more wires of the digital vehicle network. The wire holding unit may be configured to hold the wire(s) such that the unit is not movable relative to the wire(s). The wire holding unit is mountable to the wire(s) so as to securely hold the wires before the wire holding unit is connected to the sensing unit. In other words, the wire holding unit is capable of holding the wire(s) in the absence of any connection to the sensing unit. This facilitates connection of the wire holding unit and sensing unit to one another.

As discussed below, it is envisaged that the wire holding unit might hold only a single wire of a digital vehicle network in use. Thus, the invention extends to embodiments in which the wire holding unit is configured to hold only a single wire. However, typically the wire holding unit will hold first and second wires of a digital vehicle network, such as of a CAN bus where the first and second wires are a CAN low wire and a CAN high wire. It is also contemplated that the wire holding unit might be configured to hold more than two wires.

The following features of the wire holding unit are applicable regardless of the number of wires which the unit is configured to hold. Where the unit is configured to hold multiple wires, a set of corresponding features is preferably provided in respect of each wire. Thus, in preferred embodiments in which the unit is configured to hold first and second wires, the unit may comprise locating means, retaining means and biasing means in respect of each wire, (which may be referred to as the first and second locating means, retaining means, biasing means etc.). The unit is preferably configured to hold first and second wires in a side by side configuration.

The wire holding unit may comprise means for locating a wire to be held relative to the wire holding unit. The locating means may comprise a channel for receiving the wire. The wire holding unit comprises means for retaining the wire such that it is securely held by the wire holding unit. The retaining means may comprise one or more clips. In some embodiments the wire holding unit comprises clips associated with each of its respective longitudinal ends for retaining the wire.

The wire holding unit is configured to hold the or each wire such that a length of the wire is presented for engagement with a respective sensing element of the sensing unit when the wire holding unit is connected to the sensing unit in use.

Preferably the wire holding unit comprises means for biasing a wire held by the unit into engagement with a respective sensing element of the sensing unit when the wire holding unit is connected to the sensing unit in use. The biasing means may comprise a resilient strip. For example, the strip may be a strip of rubber material. In some preferred embodiments the wire engaging surface of the strip comprises a profiled surface, e.g. a sawtooth profile, preferably extending along the length of the strip. This may enhance the biasing effect. The biasing means may be located in a channel of the wire holding unit which receives a wire in use so as to be located between a wire and the base of the channel when a wire is disposed in the channel in use.

The wire holding unit is preferably elongate. The wire holding unit is preferably configured such that, when held thereby, a wire extends longitudinally from one longitudinal end of the unit to the other. This enables a length of the wire to be presented for engagement with a sensing element of the sensing unit. In embodiments in which the wire holding unit comprises a channel for locating a wire, the channel may extend from one longitudinal end of the unit to the other. In use, the or each wire may extend out of each longitudinal end of the wire holding unit.

It will be seen that in embodiments of the invention, the wire holding unit may be securely mounted to the wire(s) of the digital vehicle network by a simple clipping of the unit to the wire(s). The unit is then connected to the separate sensing unit in order to bring the wire(s) into engagement with the sensing region(s) of the sensor. This is in contrast to prior art devices in which the wires are attached to a first part of a housing of a sensor, with the sensing regions being provided on an opposed second part of the housing, hingedly connected to the first part. Such arrangements require the housing to be closed around the wires to bring them into engagement with the sensing regions.

In accordance with the invention, the wire holding unit and the sensing unit are connectable to one another. The wire holding unit and the sensing unit are configured such that, when the wire holding unit and the sensing unit are connected to one another, the or each wire held by the wire holding unit will engage a respective sensing element of the sensing unit. In embodiments, the sensing unit comprises, in respect of each wire that the wire holding unit is configured to hold, a sensing element which is aligned with the location of the wire when the wire holding unit is connected to the sensing unit in use. In preferred embodiments in which the wire holding unit comprises a channel in respect of the or each wire the unit is configured to hold, the sensing element is configured to be aligned with the channel when the sensing unit and wire holding unit are connected together. The sensing element preferably extends longitudinally over at least a portion of the length of the sensing unit. The or each sensing element may a planar element. The sensing element may be a printed element i.e. an element of a printed circuit board. Preferably the sensor is a capacitive sensor, and the or each sensing element is arranged to detect messages transferred over the network using capacitive coupling. However, it is envisaged that other arrangements, e.g. additionally or alternatively using inductive sensing, i.e. inductive coupling, could also be used.

The sensing unit comprises one or more sensing elements. In preferred embodiments in which the wire holding unit is configured to hold first and second wires of a digital vehicle network, first and second sensing elements are provided in respect of the first and second wires.

The sensing unit may comprise a recess for receiving the wire holding unit.

When the wire holding unit and sensing unit are connected together, it will be appreciated that the or each wire will extend through the interior of the resulting sensor in use.

In accordance with the invention the sensor comprises a locking means (or "locking mechanism") to lock the wire holding unit and sensing unit together when connected to one another. The units are preferably arranged such that the locking mechanism automatically engages when the units are connected together. Thus, locking and connection of the parts may be achieved through a single action by the user. The components of the locking mechanism are preferably integral with one or both of the sensing unit and wire holding unit. Thus, locking is achieved without the need of any parts in addition to the wire holding and sensing units.

The locking mechanism may comprise any suitable cooperating formations on the respective units. In preferred embodiments the sensing unit and wire holding unit are configured to resiliently fit together. When the wire holding unit and sensing unit are connected and locked together, they provide a composite sensor unit, i.e. a single unit made up of the two sub-units.

The locking mechanism may comprise a plurality of projecting elements on one of the wire holding unit and the sensing unit, and a plurality of cooperating recesses for receiving the projecting elements on the other one of the wire holding unit and the sensing unit. The projecting elements are preferably provided on the sensing unit and the recesses on the wire holding unit. The projecting elements are preferably resilient.

Preferably one of the wire holding unit and the sensing unit comprises a plurality of hooks (or projections), and the other one of the wire holding unit and the sensing unit comprises a plurality of notches, wherein each hook (or projection) is received by a respective notch to lock the wire holding unit and sensing unit together in use. In preferred embodiments the plurality of hooks (or projections) are provided on the sensing unit and the notches are provided on the wire holding unit. A notch may or may not extend fully through the thickness of the component in which it is provided i.e. it may or may not define a slot therein. Preferably the hooks are resilient hooks. The hooks may then deflect in order to enable the wire holding unit to be attached to the sensing unit, but are biased to return to their original position subsequently for locking the units together. In this way, the connection and locking of the units to one another may be achieved by a simple resilient fit between the parts. In embodiments using hooks and notches, the location and number of hooks and notches may be selected as desired to provide appropriate connection and locking between the units. In some preferred embodiments, four corresponding notches and hooks are provided. For example, a pair of hooks may be provided at each of the longitudinal ends of the wire holding unit, one on each side thereof. Such arrangements may be more secure, and do not interfere with the wires extending from each of the longitudinal ends of the wire holding unit.

In preferred embodiments the locking mechanism is a releasable locking mechanism to permit the wire holding unit and the sensing unit to be disconnected from one another. Thus, the units may be removably attached to one another. This enables the sensor to be removed and reattached at a different location as desired. The locking mechanism may allow the repeated connection and disconnection of the units from one another. In preferred embodiments the sensor further comprises means operable by a user to release the locked connection between the sensing unit and the wire holding unit. In embodiments in which the locking mechanism comprises cooperating hooks and notches, the sensor may comprise means operable by a user to disengage one or more of the hooks from their respective notches. In one preferred embodiment one or more of the hooks is mounted on a resilient wall which may be deflected outwardly by a user to disengage the hook(s) mounted thereon from their respective notches to enable release of the wire holding unit from the sensing unit. The resilience of the wall biases it back to its initial position ready to form a locking engagement again. The wall may extend along one longitudinal side of the wire holding unit when the sensing unit is connected thereto in use. Each of the hooks e.g. a pair of hooks located on that side of the wire holding unit may then be mounted to the wall. In preferred embodiments the wall is a longitudinally extending wall, (extending in the direction corresponding to the direction that the or each wire extends in use), and comprises a pair of hooks mounted thereon, one at each of its longitudinal ends.

The sensing unit further comprises processing means arranged to generate digital output signals for use, e.g. by a telematics control unit (TCU), indicative of messages transferred over the digital vehicle network and detected by the sensing means. For example, the sensed data may be in the form of an analogue signal, e.g. from a capacitive coupled voltage and/or an induced current from the coupling between the wire(s) and the sensing elements in use. This analogue signal is converted into the digital output signal. The processing means, e.g. electronic circuitry, preferably comprises a set of one or more processors. The processing means and the sensing means preferably form an integrated circuit on a printed circuit board (PCB) of the sensing unit. Thus, rather than transmitting sensed data to a remote processor for processing, the data is processed by the sensor itself. This may provide greater control over the power consumption of a system including the sensor. The processing means may be located to one side of the wire holding unit when connected to the sensing unit in use. The sensing unit may comprise, side by side, a recess for receiving the wire holding unit, and a housing containing the processing means.

The generated digital output signals are indicative of messages sent on the digital vehicle network. The digital output signals may be of any form which permits information about data transmitted on the digital vehicle network to be determined, directly or indirectly. For example, in embodiments, the digital output signals correspond to signals on the one or more wires. In other words, the processing means reconstructs the messages transferred over the digital vehicle network, such that the output signals are essentially identical to the signals sensed by the sensing means. However, in preferred embodiments, as discussed in more detail below, the one or more signals are indicative of a (logical) state of a digital communications network, e.g. dominant or recessive state in the case of a CAN bus.

In embodiments in which signals transmitted on first and second wires of a digital vehicle network are detected, preferably first and second output signals are obtained. The first and second output signals may be indicative of data transmitted on the first and second wires, e.g. on CAN high and CAN low wires of a CAN bus.

The processing means preferably comprises a set of one or more digital logic gates for use in generating the digital output signals based on the input data received from the sensing means. In such embodiments, the digital output signals preferably comprise the signals output from the one or more digital logic gates.

It is believed that such arrangements are advantageous in their own right, independent of the particular sensor construction of the first aspect of the invention. It has been found that by using a set of one or more logic gates, power consumption of the sensor may be reduced, and the circuitry may be made simpler and more cost effective. The logic gates may provide a simple way to obtain a digital output signal representative of the sensed data, and more specifically indicative of a state of the digital vehicle network.

In accordance with a second aspect of the invention, there is provided a (contactless) sensor for reading messages transferred over a digital communications network of a vehicle, wherein the network has at least two states, and wherein information in a message transferred over the network is represented by the state of the network, the sensor comprising:

wire holding means arranged to hold one or more wires of the network;

sensing means arranged to detect messages carried by the one or more wires using capacitive and/or inductive coupling; and processing means comprising a set of one or more digital logic gates to generate digital output signals indicative of the changing state of the network detected by the sensing means.

The present invention in this further aspect may include any or all of the features described in relation to the invention in its first aspect. Thus, the sensor may include separate wire holding and sensing units as earlier described, although, in this further aspect, the sensor need not be of this construction.

The further features of the processing means which will now be described, and the steps which may be used in obtaining one or more digital output signals based on sensed input data are applicable to the invention in any of its aspects, e.g. the sensor of the first aspect, as well as the sensor of the further aspect.

In accordance with the invention in any of its aspects, the sensor may be arranged to sense data transmitted on one or more wires of the digital vehicle network. The one or more wires may be wires of a communication bus e.g. a CAN bus. Preferably one or more, or each of the one or more digital output signals obtained by the processing means is indicative of a state of the communication bus. The first and second wires are preferably CAN high and CAN low wires of a CAN communication bus. A CAN communication bus, whether high speed or low speed, has two logical states: dominant and recessive. The, each or a signal may be indicative of changes in the state of the communication bus between dominant and recessive states.

The state of a communication, e.g. CAN, bus is based upon a differential between signals carried on the wires of the bus e.g. CAN high and CAN low signals. Thus, in accordance with any of the aspects or embodiments of the invention involving the one or more digital output signals obtained by the processing means being indicative of a state of a communication bus, a change in state of the bus may be determined based upon a determined differential between signals transmitted on first and second wires of the bus. Preferably the sensor is arranged to sense signals transmitted on first and second wires of a communication bus of the digital vehicle network, and the processing means is arranged to obtain the one or more digital output signals based on a determined differential between signals transmitted on the first and second wires. Preferably the processing means of the sensor comprises a comparator for detecting a differential between signals transmitted on the first and second wires. An output signal may be obtained by the operation of one or more logic gates on the detected differential.

Thus, in preferred embodiments, the processing means uses a combination of a comparator and a set of one or more logic gates to obtain the output signal(s). Preferably, the comparator is a positive feedback comparator and has a bias voltage is applied to the inputs of the comparator, such that the output of the comparator indicates the latest state of the network. In other words, the biasing and positive feedback applied to the comparator mean that, between CAN signal transitions, i.e. during times when the signals on the CAN bus are static, the output of the comparator represents the differential detected at the last transition. The set of one or more logic gates may operate on the output of the comparator. Preferably the logic gate(s) comprise one or more inverters. Where first and second digital output signals are obtained, an inverter may be provided in respect of each output signal.

The sensor of the invention is not limited to use with a CAN network, and may be applicable to any form of digital network which may be used in a vehicle, e.g. automobile, whether current or future. For example, the network may be a Local Interconnect Network (LIN). It will be appreciated that any reference herein to a CAN bus may be replaced by a reference to any other form of digital vehicle network, unless the context demands otherwise, and references to a CAN bus should be understood to be merely exemplary.

In accordance with the invention in any of its aspects and embodiments, the sensor further comprises an output for use in connecting the unit to a telemetric device. The output may be configured to connect to a cable. In accordance with the first aspect of the invention the sensing unit preferably provides the output. An output may be provided adjacent the processing means e.g. to one side of the wire holding unit when connected to the sensing unit. In accordance with the invention in any of its aspects, the output may be arranged to provide one or more output signals. In preferred embodiments the output comprises first and second digital output signals e.g. indicative of data transmitted on first and second wires e.g. CAN high and CAN low wires of a CAN communication bus.

In those aspects and embodiments in which one or more digital output signals are provided by the sensor using one or more logic gates, preferably the or each output signal of the sensor corresponds to an output of a one of the set of one or more logic gates. In some embodiments, each digital output signal corresponds to the output of an inverter. In this way, the output of the set of one or more logic gates may be connected directly to the input of a telematics device when the output of the sensor is connected to the input of the telematics device. The output of the sensor may be used to send data to a telemetric control unit of a telemetric device for use in desired applications.

The invention extends to the use of data provided by a sensor in accordance with the invention in any of its aspects or embodiments by a telemetric device.

It has been found that, in particular embodiments at least, the sensor of the present invention in its various aspects and embodiments may be more power efficient than prior art wireless digital vehicle network sensors. This may enable a lower supply current to be used.

The present invention extends to a system comprising a telemetric device and the sensor of the invention in any of its aspects or embodiments, and means for connecting the sensor to the telemetric device. The means for connecting the sensor and the device is preferably a cable. The cable provides a data connection, and preferably both a power and data connection, between the telemetric device and the sensor. The telemetric device may be used to power the sensor. The cable preferably has a length of less than 1 m. By limiting the length of the cable, the power consumption of the system may be reduced. By providing a sensor as part of such a system, and, in embodiments at least, carrying out processing as described at the sensor to provide an output for transmission over a cable to the telemetric device, it has been found that power consumption may be reduced, as there is control over the system as a whole. The telemetric device may be of any type, and may, for example, be of any of the types described in the background section above.

The present invention extends to a method of installing the sensor in accordance with the invention of any of the embodiments of those aspects including a sensing unit and wire holding unit, the method comprising first mounting the wire holding unit to one or more (preferably two) wires of a digital vehicle network so that the wire(s) are held by the unit, and then connecting the sensing unit to the wire holding unit in a manner such that the locking mechanism locks the wire holding unit and the sensing unit together. The wire(s) of the digital vehicle network are preferably wire(s) of a communication bus of the network, such as a CAN bus or LIN bus. In some exemplary embodiments the wire holding unit is mounted to two wires of a CAN bus i.e. the CAN low and CAN high wires. Whatever the type of network involved, it is envisaged that while the wire holding unit will typically be mounted to two wires of the network, in some situations, the wire holding unit might be mounted to only a single wire. For example, the unit might be mounted to only one of the CAN low or the CAN high wire. Thus the unit may be mounted to the CAN low and/or the CAN high wire.

The wire holding unit and/or the sensing unit may be provided with printed instructions to help the user connect the wires appropriate with respect to the wire holding unit and to orientate the wire holding unit correctly with respect to the sensing unit e.g. labels "CAN low", "CAN high" etc.

Where the sensor is connected to multiple wires, the wires are typically associated with the same digital vehicle network, although it could be envisaged that the wires might be associated with different networks. However, preferably the wires are associated with the same network, and, if sensing of a second digital vehicle network is required, a second sensor may be used. Alternatively or additionally, if connection to multiple locations on a given digital vehicle network is required, multiple sensors may be used. Each may be of identical construction to the first.

The above features regarding the installation of a sensor to one or more wires are applicable to those further aspects of the invention, in which a sensor is used to sense data transmitted on one or more wires, regardless of whether the sensor is of the construction of the first aspect. Thus, the sensor may be mounted to one or preferably first and second wires as described.

The sensor of the invention, in any of its aspects, may be of any suitable dimensions. By way of example, the sensor may have no dimension greater than 10 cm or 5 cm. The wire holding unit may have a width no greater than 50% of the width of the sensing unit. The length of the sensor and its parts is defined in the direction of the extent of the wires in use.

The method also extends to a method of operating the sensor in accordance with the present invention, in any of its aspects and embodiments. The method comprises operating the sensor, wherein the processing means determines one or more digital output signals indicative of data sent on the digital vehicle network based on input data sensed by the sensing means. The processing means may operate in accordance with any of the embodiments earlier described.

The present invention in accordance with any of its further aspects or embodiments may include any of the features described in relation to any of the other aspects or embodiments to the extent it is not mutually inconsistent therewith.

BRIEF DESCRIPTION OF THE DRAWINGS

Some preferred embodiments of the present invention will now be described, by way of example only, and with reference to the accompanying drawings, in which.

DETAILED DESCRIPTION

Figure 1:
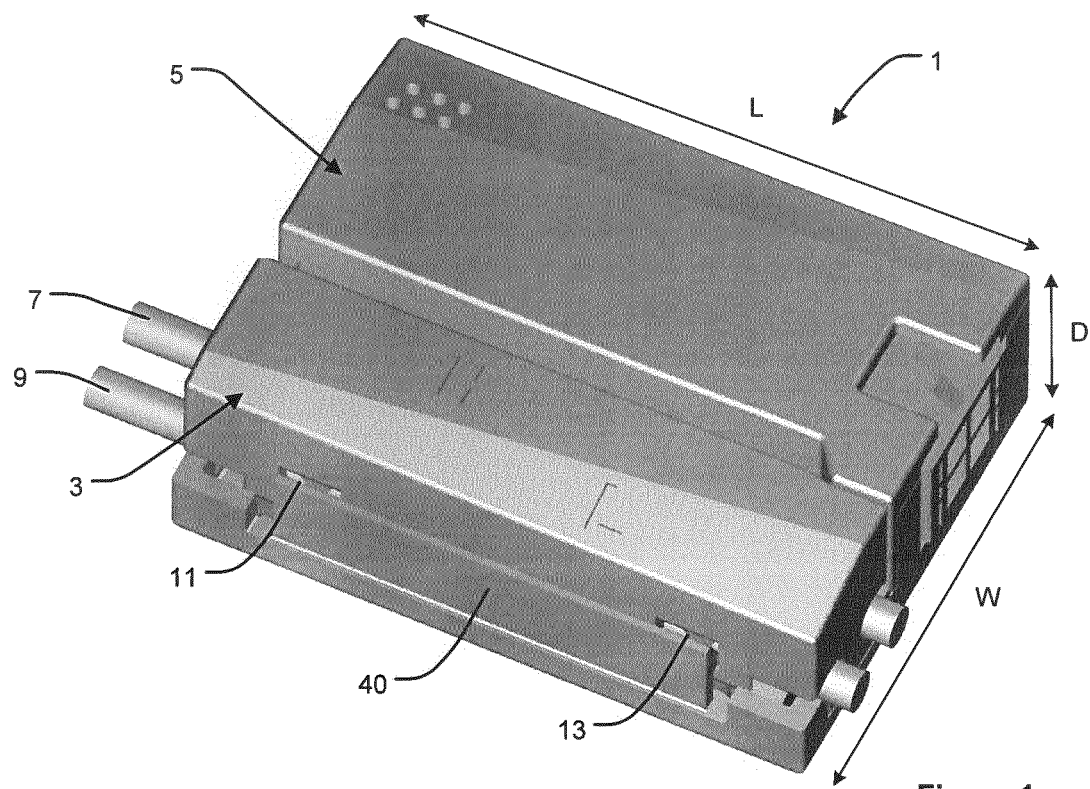
FIG. 1 is a perspective view of a sensor in accordance with an embodiment of the invention, including a wire holding unit and a sensing unit, showing the wire holding unit attached to a pair of wires.

FIG. 1 illustrates a sensor for sensing data transmitted over a digital vehicle network in accordance with an embodiment of the invention. For the purposes of illustration, the sensor is described in relation to sensing data transmitted over a CAN bus of a vehicle. However, it will be appreciated that the sensor may be applied to other types of vehicle network e.g. a LIN network.

The sensor 1 is made up of two units; a wire holding unit 3, and a sensing unit 5. In the configuration shown in FIG. 1, the wire holding unit 3 and the sensing unit 5 are locked together, by operation of a locking mechanism which will be described below. The sensor 1 is shown in FIG. 1 being connected to the CAN high 7 and CAN low 9 wires respectively of the CAN bus.

Figure 2:
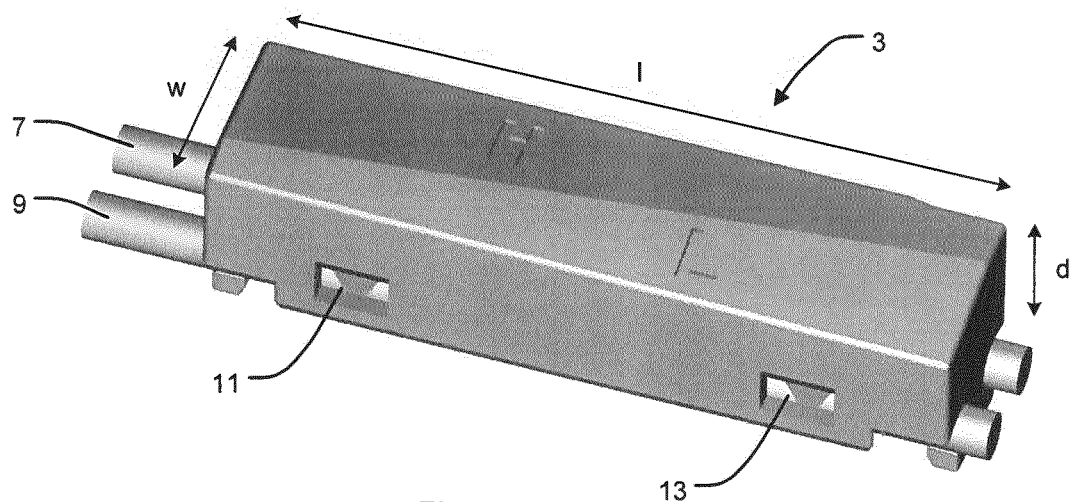
FIG. 2 is a perspective view of the wire holding unit for use in the sensor of FIG. 1.
Figure 3:
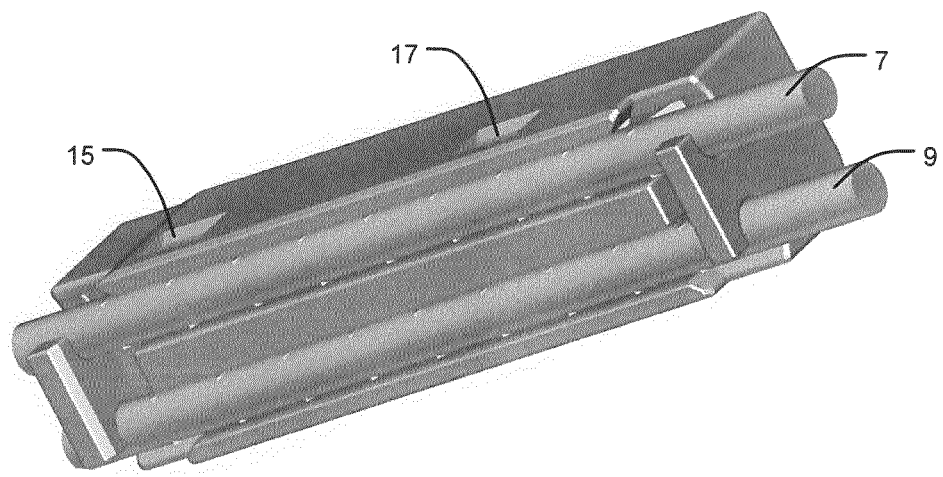
FIG. 3 shows the wire holding unit of FIG. 2 from the underside to illustrate certain features in more detail.
Figure 4:
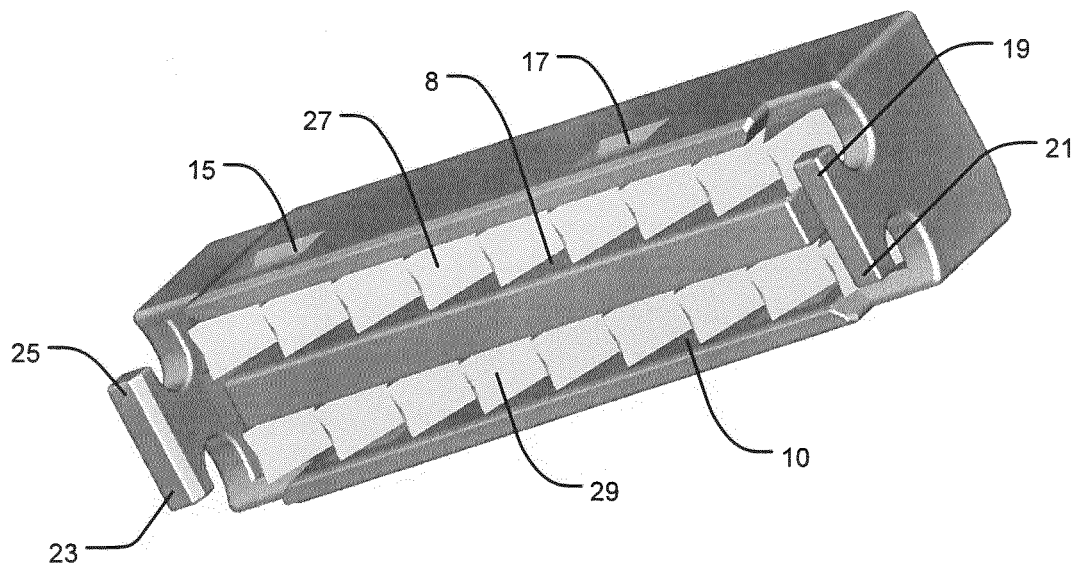
FIG. 4 corresponds to FIG. 3 but with the wires omitted to illustrate certain feature of the wire holding unit in more detail.

The features of the wire holding unit 3 will now be described in more detail by reference to FIGS. 2-4. As shown in FIG. 2, along the longitudinal side of the wire holding unit 3, corresponding to the direction in which the wires extend, two notches 11, 13, in the form of slots extending through the wall of the unit 3, are provided. An identical pair of notches 15, 17 is provided on the opposite longitudinal side of the unit, as may be seen in FIG. 3, which is a view from the underside of the unit. These notches form one part of a locking mechanism for locking the wire holding unit 3 to the sensing unit 5, as described below.

The way in which the wires are retained by the wire holding unit 3 will now be described by reference to FIG. 4. FIG. 4 corresponds to FIG. 3, but with the wires omitted for ease of illustration. Here it may be seen that the wire holding unit 3 defines two longitudinally extending channels 8, 10, for locating the respective wires. At each longitudinal end of channel 8, a clip 19, 25 is provided. A corresponding pair of clips 21, 23 is provided, one at each of the longitudinal ends of the channel 10. These clips are used to retain the wires in their respective channels. Disposed in each of the channels is a respective strip of rubber material, 27, 29. The strip of rubber material is located between the base of the channel and the wire disposed therein use, and acts to bias the wire into engagement with the capacitive coupling element associated with the wire when the wire holding unit 3 is connected to the sensing unit 5 in use. The wire engaging surface of each rubber strip 27, 29 has a dog tooth profile.

Figure 5:
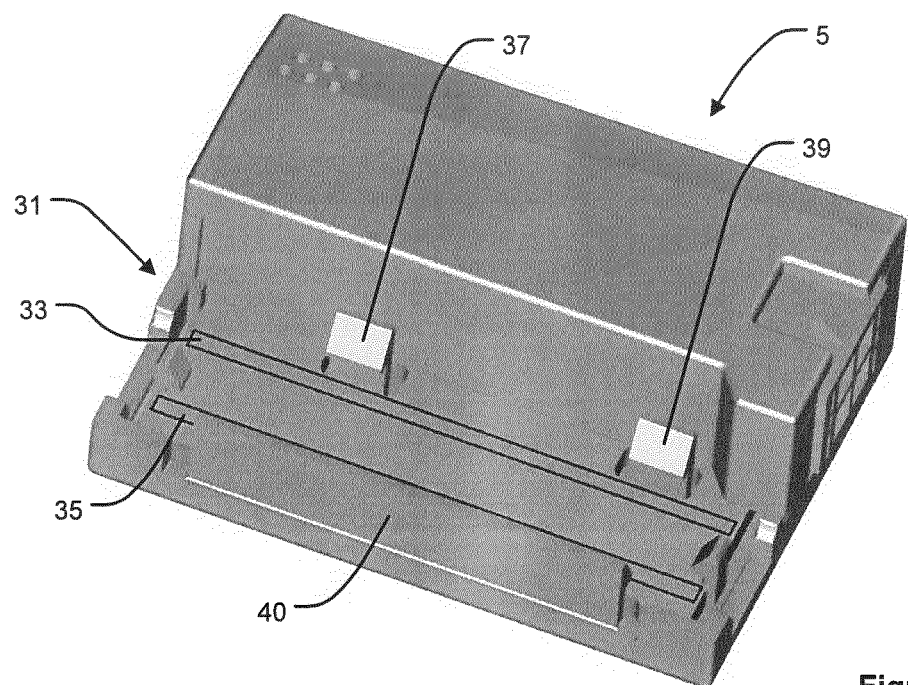
FIG. 5 is a perspective view of the sensing unit of the sensor of FIG. 1.
Figure 6:
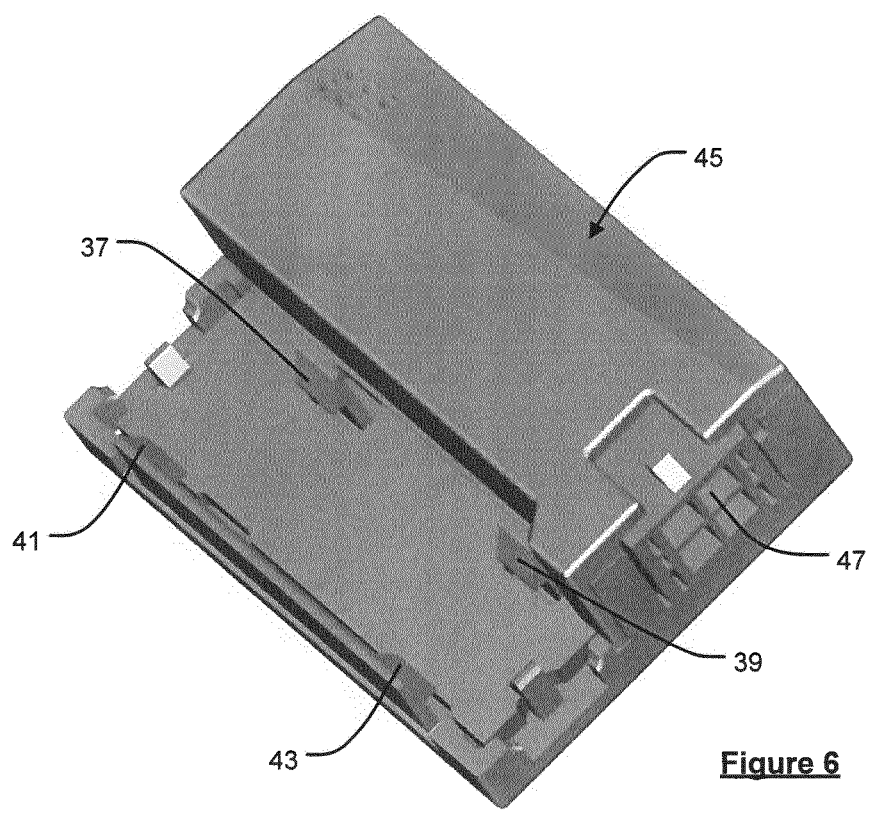
FIG. 6 is a further perspective view of the sensing unit of FIG. 5, with the sensing elements omitted.

The sensing unit 5 will be described in more detail by reference to FIGS. 5 and 6. On one side the sensing unit 5 has a recess 31 for receiving the wire holding unit 3 when connected thereto in use. The base of the recess 31 includes a pair of PCB (printed circuit board) copper traces 33, 35, which provide capacitive coupling elements for capacitive coupling with the wires 7, 9 in use.

On one side of the recess, a pair of resilient hooks 37, 39 are provided, one at each longitudinal end. On the opposite side of the recess, a resilient wall 40 is provided, having a pair of resilient hooks 41, 43 at each of its longitudinal ends. This may be seen more clearly in FIG. 6. As described below, the hooks 37, 39, 41, 43 form part of the locking mechanism for locking the sensing unit 5 and wire holding unit 3 together in use.

The other part of the sensing unit 5 has a cover 45, and houses the processing means of the unit, for obtaining digital signals indicative of data transmitted on the CAN bus. An output, which is illustrated as a 4-pin output, is provided, for connection to a power and data cable, to enable the sensor to be connected to a telematics unit in use.

Figure 7:
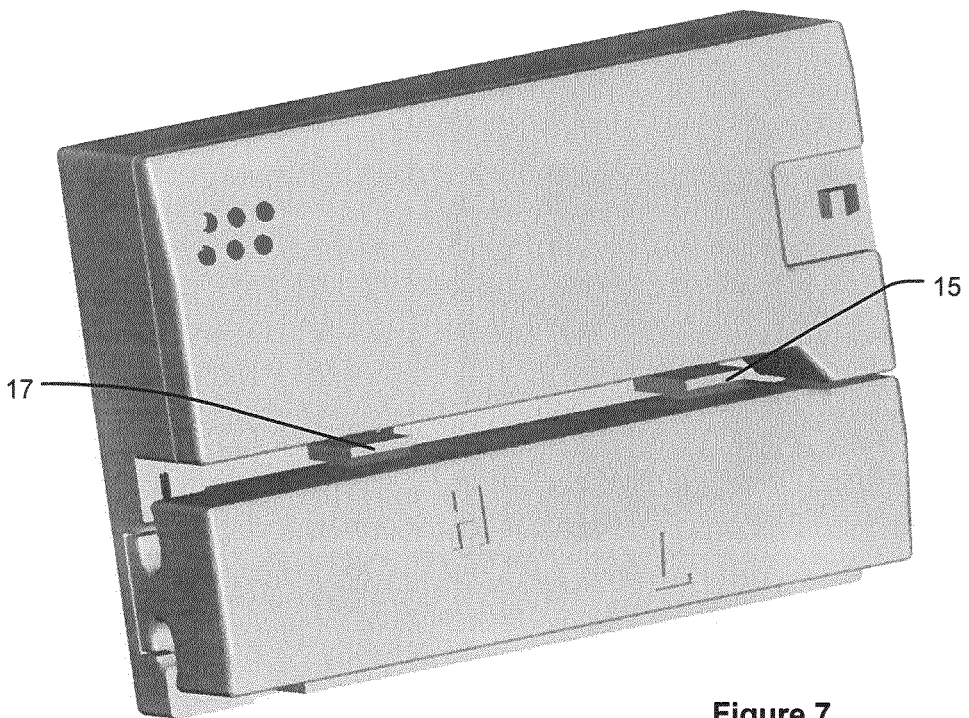
FIG. 7 is another view of the sensor of FIG. 1 taken from above, showing certain features of the locking mechanism in more detail.

The sensing unit 5 may be connected to the wire holding unit 3, and locked thereto by means of a locking mechanism. The locking mechanism is provided by engagement of the resilient hooks 37, 39, 41 and 43 on the sensing unit 5 with the notches 11, 13, 15, 17 on the wire holding unit 3, when the wire holding unit 3 is pressed into the recess 31 in the sensing unit 5, as shown in FIG. 1. FIG. 1 shows the engagement of the resilient hooks 41, 43 with the notches 11, 13. FIG. 7 shows more clearly the engagement of the hooks 37, 39 with the notches 15, 17 on the other side of the wire holding unit 3. When the wire holding unit 3 is connected to the sensing unit 5 in this way, the wires 7, 9 are pressed into contact with the capacitive coupling elements 33, 35 respectively.

Figure 8:
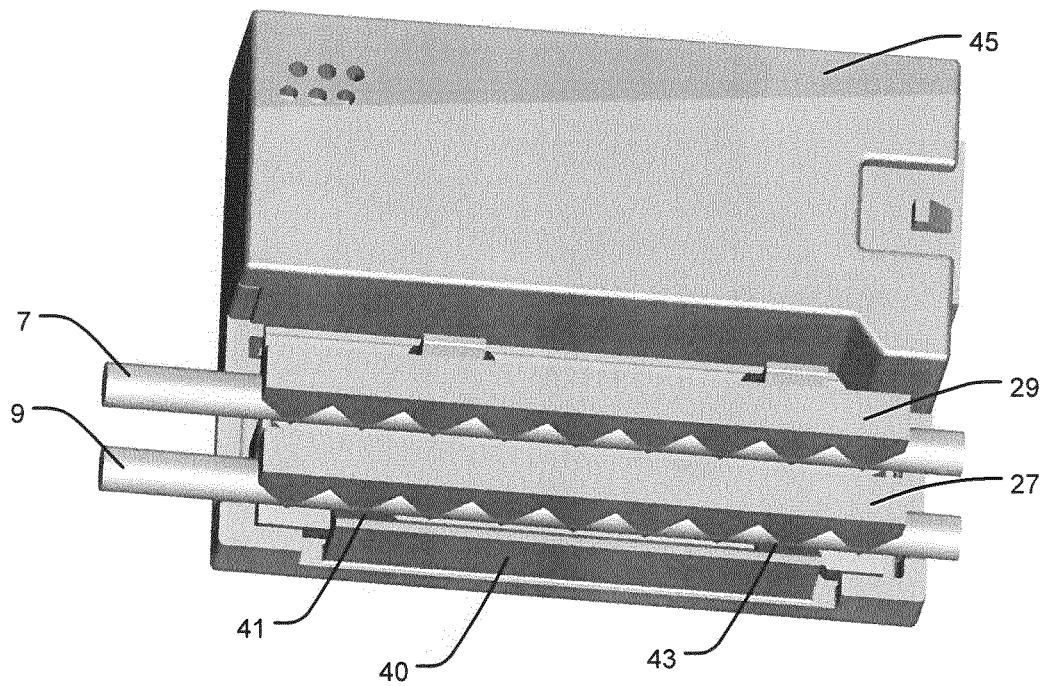
FIG. 8 is a view corresponding to FIG. 7 but with the cover of the wire holding unit omitted to show the way in which the wires are biased into contact with the sensing means of the sensing unit more clearly.

FIG. 8 is a view similar to FIG. 7, but with the cover of the wire holding unit 3 removed to illustrate certain features more clearly. Here it may be seen how the rubber strips 27, 29 engage the wires 7, 9, and bias them into engagement with the underlying capacitive coupling elements 33, 35.

The resilient wall 40 is a release element, which may be deflected outwardly by a user to disengage the hooks 41, 43 from the notches 11, 13 respectively, enabling the wire holding unit 3 to be removed from the sensing unit 5, when desired.

Figure 9:
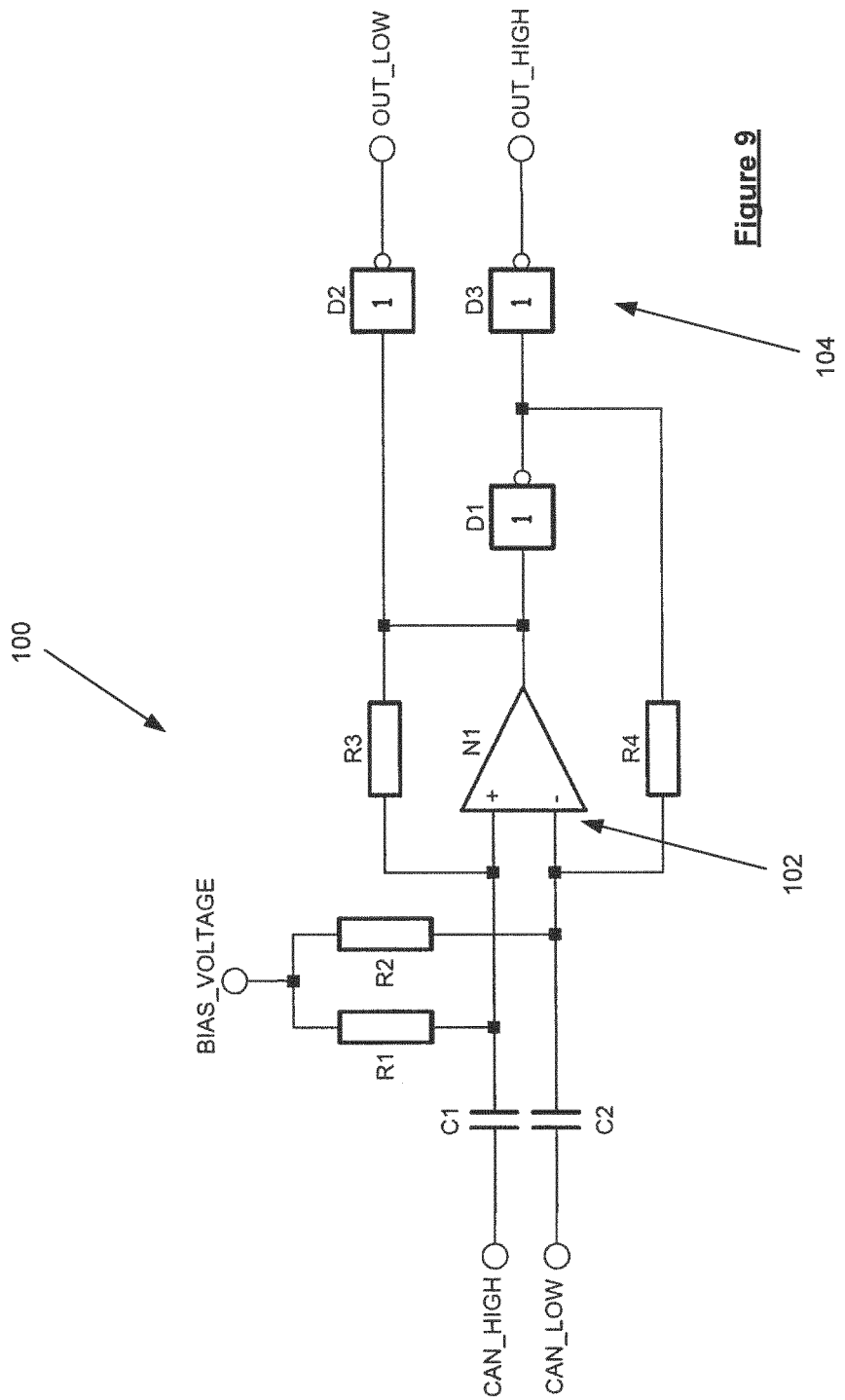
FIG. 9 illustrates some exemplary circuitry which may be used in the sensor of the present invention.

One embodiment of suitable circuitry 100 of the processing means of the sensing unit 5 for obtaining digital output signals indicative of data transmitted on the CAN bus will now be described by reference to FIG. 9.

The inputs to the circuit are the capacitance sensed in respect of the CAN high 7 and CAN low wires 9, by virtue of the capacitive coupling between the wires and the capacitive coupling elements 33, 35. The sensed capacitance for each wire provides an analogue signal indicative of the data sent on the wire. The two inputs in respect of the CAN high and CAN low wires are labelled CAN_HIGH and CAN_LOW.

The circuitry 100 is arranged to provide digital output signals, one in respect of each of the CAN HIGH and CAN LOW wires, each in the form of a digital signal indicative of the state of the CAN bus. This is achieved using a comparator 102 and a set of logic gates 104.

Figure 10A:
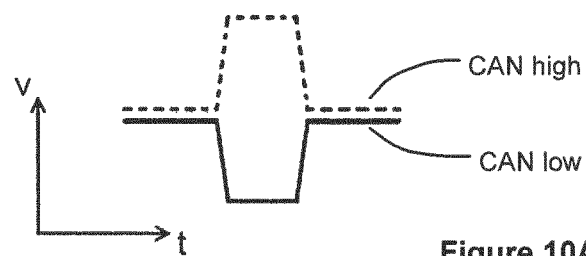
FIG. 10A illustrates the transition between dominant and recessive states for a high speed CAN bus.
Figure 10B:
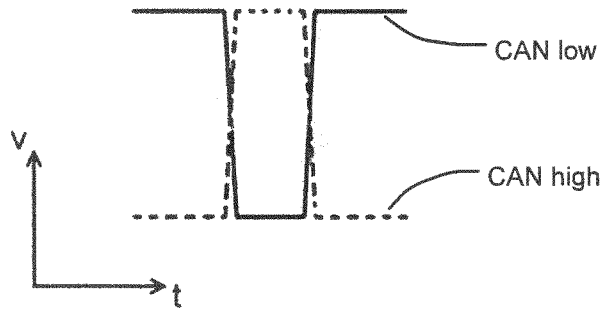
FIG. 10B illustrates the transition between dominant and recessive states for a low speed CAN bus.

As indicated in FIGS. 10A, and 10B, both high speed and low speed CAN buses transition between recessive and dominant states. A high speed CAN is defined in ISO 11898-2, while a low speed CAN is defined in ISO 11898-3. In the case of both high and low speed CANs, the bus can be determined to be in either a recessive or dominant state based on a differential between the CAN high and CAN low voltages. For example, as shown in FIG. 10A, for a high speed CAN, the CAN bus is deemed to be in a dominant state when the differential between the CAN high and CAN low voltages exceeds a certain threshold. FIG. 10B shows the corresponding recessive and dominant states for a low speed CAN.

In accordance with the invention, in the case of either a low speed or high speed CAN, the comparator 102 detects a differential between the input CAN low and CAN high voltages, and is therefore able to detect a transition between the recessive and dominant states of the CAN bus. This data is input to a set of logic gates 104, in the form of inverters (D2, D3). One inverter is provided in respect of each of the outputs of the circuit.

In the circuit, C1 and C2 indicate the coupling capacity between the CAN HIGH and CAN low wires respectively and the sensing elements of the sensing unit. R1 and R2 are bias voltage resistors, and R3 and R4 are feedback resistors. D1 is a further inverter used for obtaining a further feedback signal.

The comparator 102 is trigged by CAN signal transitions, because only voltages changes (transients) can be capacitive coupled. Due to biasing and the positive feedback, the comparator 102 stores the latest state of the CAN bus during the time between transients, i.e. when the CAN signals are static. The resistors R1, R2, R3 and R4 determine the trigger value of the sensor according to the bias voltage and the comparator output voltage. Without the positive feedback, which is provided by resistors R3 and R4, the comparator could be unstable between transients (on the CAN bus) because the compactor input voltage can be about zero (0V).

The outputs of the circuit at OUT_LOW and OUT_HIGH, are in the form of digital signals indicative of the state of the CAN bus. The signals comprise data indicative of the changes of the CAN bus between dominant and recessive states, which is, in turn, indicative of data e.g. messages transmitted on the CAN bus. The OUT_LOW and OUT- _HIGH outputs provide digital signals which may be indicative of data transmitted on the CAN high and CAN low wires respectively.

Figure 11:
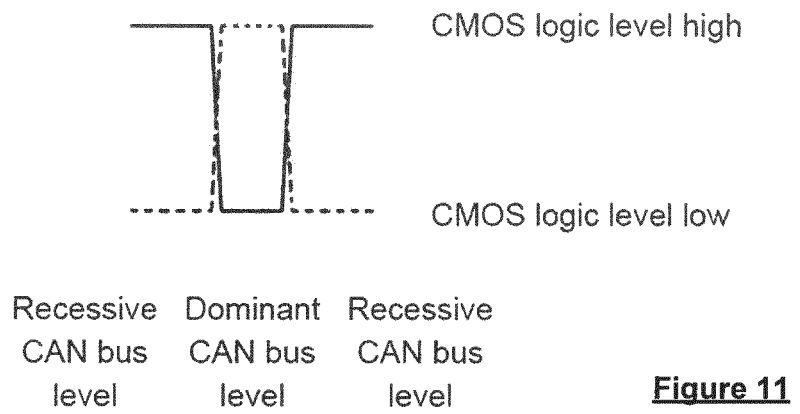
FIG. 11 illustrates the correspondence of the output of the logic gates of the circuit shown in FIG. 9 to the states of the CAN bus.

FIG. 11 illustrates the way in which the outputs of the circuit are mapped to the states of the CAN bus. It will be seen that a recessive state of the CAN will result in the OUT_LOW output signal, being 1, and the OUT_HIGH signal being 0. Conversely, a dominant state will result in OUT_LOW=0 and OUT_HIGH=1.

Figure 12:
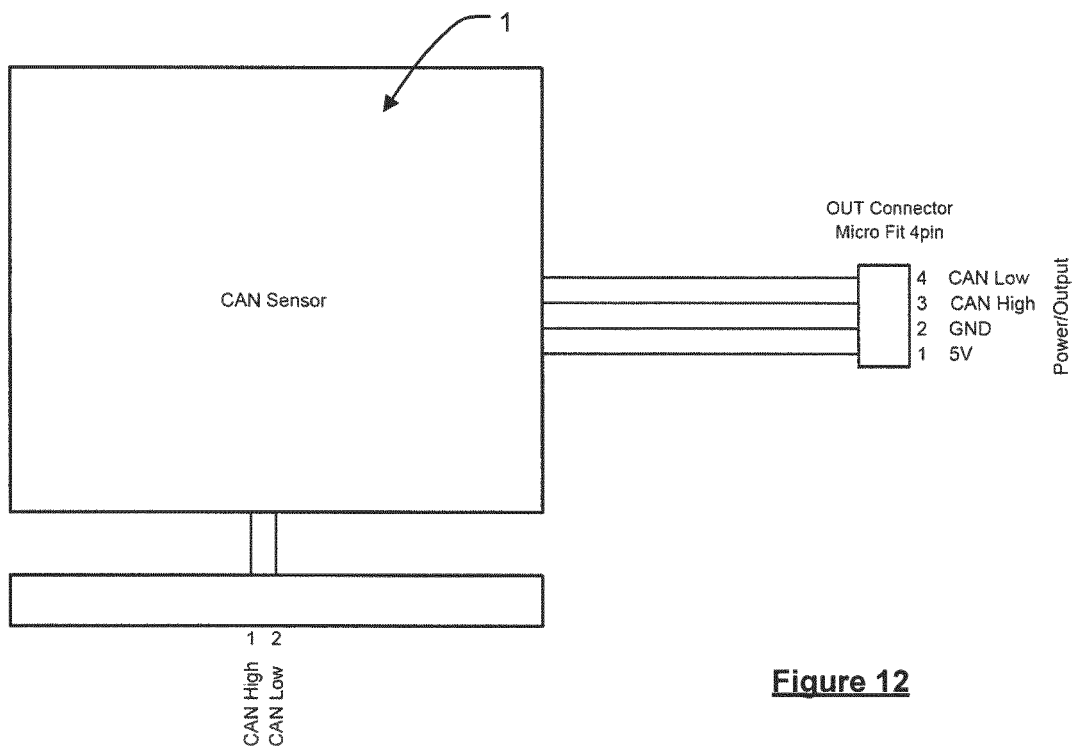
FIG. 12 is a schematic overview of the inputs and outputs of the sensor.

The output of the logic gates 104 provides the outputs OUT_LOW and OUT_HIGH of the sensor. Each one of these outputs corresponds to the output of one of the inverters D2 and D3 respectively. These outputs are provided to the output 47 of the sensing unit. In the illustrated embodiment, the output 47 of the sensing unit is a 4 pin connector, with the OUT_LOW and OUT_HIGH signals being provided at two of the pins. This is indicated in FIG. 12. FIG. 12 schematically illustrates the operation of the sensor 1. The sensor has inputs CAN high and CAN low, corresponding to CAN_HIGH and CAN_LOW in FIG. 9. The outputs of the sensor include signals representative of the CAN Low and CAN high signals of the CAN bus. These correspond to OUT_LOW and OUT_HIGH in FIG. 9.

The OUT_LOW and OUT_HIGH sensor outputs (corresponding to CAN low and CAN high in FIG. 12), are provided to directly as inputs to a telematics unit, through connection of a power and data cable to the sensor outputs. It has been found that providing the output of logic gates directly to a telematics unit in this way leads to benefits in terms of power consumption and reduced current requirement.

The use of the comparator and logic gates as exemplified herein has been found to be particularly simple and effective.

The sensor 1 forms part of a system for obtaining data from a CAN bus, and providing it to a telematics device. The system also includes a (power and data) cable which is connected to the output 47 of the sensor 1 at one end, and a telematics control unit, such as a TomTom® LINK device, which may be installed or to be installed in a vehicle. The other end of the cable is connected to an input of the telematics device in use. This system has been found to be particularly power efficient, and may operate at relatively low current levels. The sensor derives its power from the telematics device via the power cable. Particular benefits in power consumption reduction are found if the cable has a length of less than 1 m.

Use of the sensor will now be described. The user takes the wire holding unit 3, and clips the CAN low and CAN high wires of a vehicle CAN bus into the respective channels 8, 10 thereof. This will involve untwisting a length e.g. around 3-4 cm of the wires. The user then connects the wire holding unit 3 to the sensing unit 5, pushing the wire holding unit 3 into the recess 31 of the sensing unit 5, so that the resilient hooks 37, 39, 41, 43 enter their respective notches 11, 13, 15, 17 with an audible click.

The user then connects one end of a power and data cable to the output 47 of the sensing unit 5, and connects the other end of the cable to the input of a telematics device.

It will be appreciated that where a vehicle includes multiple CAN buses, the sensor may be connected to either CAN bus. If desired, a second (or further) sensor may be connected to a second (or further) CAN bus. Each further sensor may be connected by a respective further (power and data) cable to a further input of the telematics device.

Some suitable dimensions of a sensor device in accordance with one embodiment of the invention will now be described, by way of example only. The assembled sensor 1 has a length L of 40 mm, a width W of 30 mm and a depth D of 12.5 mm. The capacitive sensing elements 33, 35 each have an area of 34.5 mm×3.0 mm. The wire holding unit 3 has a length l of 40.5 mm, a width w of 12.0 mm and a depth d of 11.0 mm.

It has been found that the current consumption of the sensor may be less than 2 mA at 5V, which corresponds to less than 1 mA at 14V. This is considerably lower than prior art sensors, which may, for example, require around 6.5 mA at 14 V. The current consumption of an exemplary telematics control unit connected to two of the sensors (in respect of the CAN bus 1 and CAN bus 2 of the vehicle), in a sleep mode would be less than 3 mA at 14V. This is in comparison to around 14 mA at 14 V for prior art sensors. This leads to benefits in terms of cost reduction. It has also been found that the power wiring of the sensors may be achieved more easily than prior art sensors which may require separate connection to a board voltage.

The sensor has been found to be suitable for use with both high speed CAN buses and low speed CAN buses.

A reduced power consumption is beneficial in that the sensor may be able to always be on, but in a sleep mode, waking up a telematics device when data is detected.

The invention claimed is:

1. A sensor for reading messages transferred over a digital communications network of a vehicle, the sensor comprising:
    a wire holding unit arranged to hold one or more wires of the network; and
    a sensing unit comprising:
        sensing means for detecting messages carried by the one or more wires using capacitive and/or inductive coupling; and
        processing means for generating digital output signals indicative of messages detected by the sensing means,
    wherein the wire holding unit and sensing unit are provided separately and are connectable to one another,
    the sensor further comprising locking means for, when the wire holding unit and the sensing unit are connected to one another, locking the wire holding unit and the sensing unit together.

2. The sensor of claim 1, wherein the wire holding unit comprises, for each of the one or more wires to be held, means for locating the wire relative to the wire holding unit, and means for retaining the wire such that it is securely attached to the wire holding unit.

3. The sensor of claim 1, wherein the wire holding unit further comprises means for biasing the wire into engagement with a respective sensing element of the sensing unit when the wire holding unit is connected to the sensing unit in use.

4. The sensor of claim 1, wherein the wire holding unit is configured to hold first and second wires of a digital vehicle network.

5. The sensor of claim 1, wherein the sensor is a capacitive sensor comprising one or more sensing elements, each sensing element being a capacitive coupling element arranged to form a capacitive coupling with a respective wire held by the wire holding unit in use.

6. The sensor of claim 1, wherein one of the wire holding unit and the sensing unit comprises a plurality of hooks, and the other one of the wire holding unit and the sensing unit comprises a plurality of notches, wherein each hook is received by a respective notch to lock the wire holding unit and sensing unit together in use.

7. The sensor of claim 6, wherein the plurality of hooks are provided on the sensing unit and the notches are provided on the wire holding unit.

8. The sensor of claim 1, where the locking means comprise a releasable locking mechanism to permit the wire holding unit and the sensing unit to be disconnected from one another.

9. The sensor of claim 1, wherein the digital communications network has at least two states, wherein information in a message transferred over the network is represented by the state of the network, and wherein the processing means comprises a set of one or more digital logic gates to generate the digital output signals, which are indicative of the changing state of the network detected by the sensing means.

10. A sensor for reading messages transferred over a digital communications network of a vehicle, wherein the network has at least two states, and wherein information in a message transferred over the network is represented by the state of the network, the sensor comprising:
   wire holding means for holding one or more wires of the network;
   sensing means for detecting messages carried by the one or more wires using capacitive and/or inductive coupling; and
   processing means comprising a set of one or more digital logic gates configured to generate digital output signals indicative of the changing state of the network in response to the charging state of the network being detected by the sensing means.

11. The sensor of claim 10, wherein the logic gates comprise one or more inverters.

12. The sensor of claim 10, wherein the sensor is arranged to sense signals transmitted on first and second wires of the digital vehicle network, and the processing means is arranged to obtain the one or more digital output signals based on a determined differential between signals transmitted on the first and second wires.

13. The sensor of claim 12, wherein the sensor comprises a comparator for detecting a differential between signals transmitted on the first and second wires.

14. The sensor of claim 13, wherein: a positive feedback is applied to the comparator; and a bias voltage is applied to the inputs of the comparator, such that the output of the comparator indicates the latest state of the network.

15. The sensor of claim 13, wherein the one or more digital logic gates operate on the output of the comparator.

16. A system for reading messages transferred over a digital communications network of a vehicle, the system comprising:
   a first housing comprising one or more clips configured to independently hold in place one or more wires of the network;
   a second housing comprising a sensing element configured to detect messages carried by the one or more wires using capacitive and/or inductive coupling,
   wherein the first housing and second housing are provided separately and each of the first housing and the second housing further comprise reciprocally cooperating elements configured to selectively lock the first housing and the second housing together; and
   one or more processors configured to generate digital output signals indicative of the detected messages.

17. The system of claim 16, further comprising a telemetric device electrically and communicatively linked to the one or more processors.

18. The system of claim 16, wherein the first housing comprises, for each of the one or more wires, a channel for receiving the respective wire.

19. The system of claim 16, wherein the first housing comprises, for each of the one or more wires, one or more clips configured to retain the respective wire such that it is securely retained within the first housing.

20. The system of claim 16, wherein the first housing comprises, for each of the one or more wires, a resilient strip for biasing the wire into engagement with a respective sensing element of the second housing when the first housing is connected to the second housing in use.

* * * * *